UNITED STATES PATENT OFFICE.

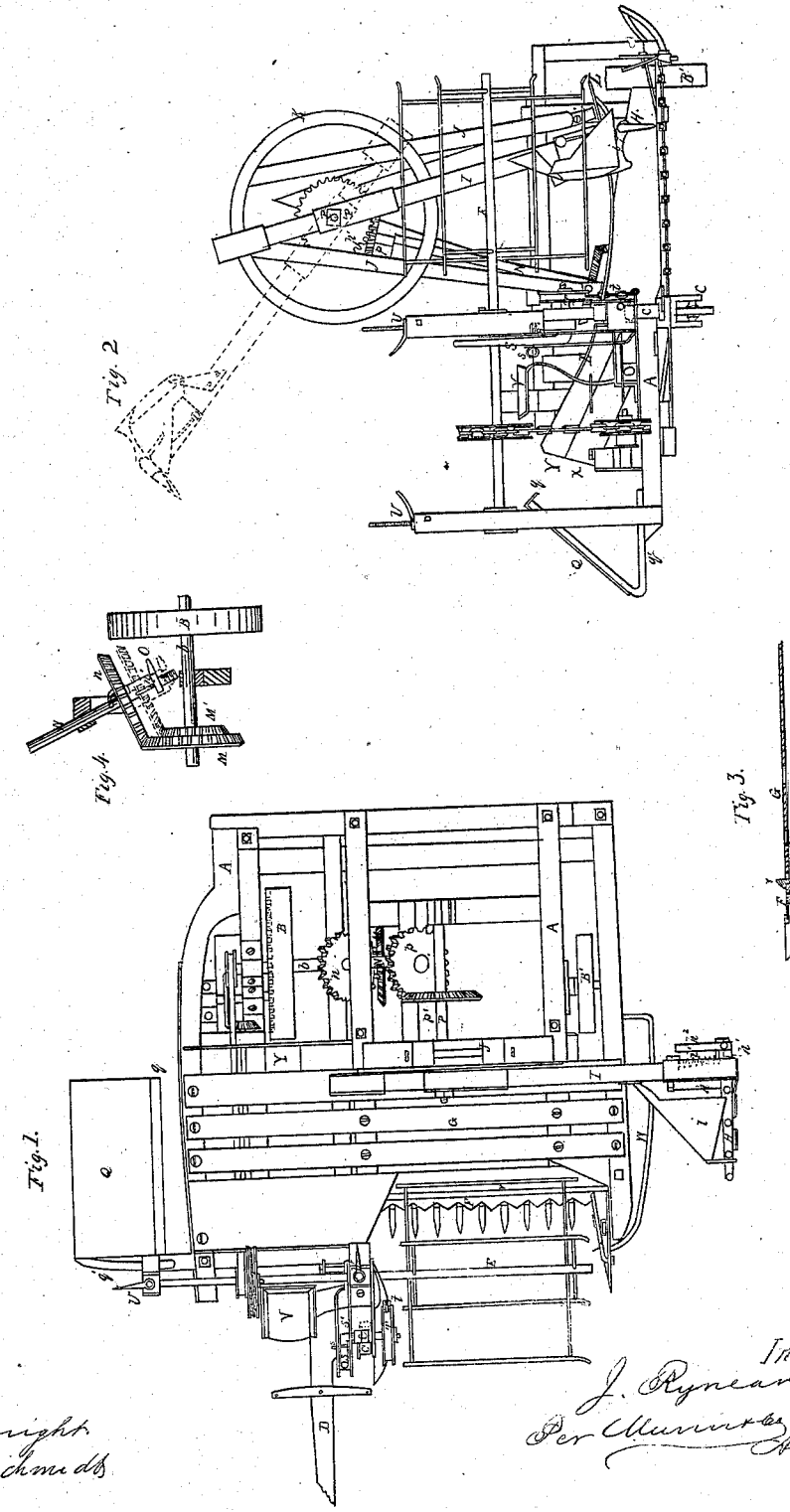

JOHN RYNEARSON, OF FARMINGTON, ILLINOIS.

IMPROVEMENT IN HARVESTERS.

Specification forming part of Letters Patent No. 36,800, dated October 21, 1862.

*To all whom it may concern:*

Be it known that I, JOHN RYNEARSON, of Farmington, in the county of Fulton and State of Illinois, have invented certain new and useful Improvements in Machines for Harvesting Grain; and I do hereby declare the following to be a full and exact description of the same, reference being had to the accompanying drawings, making part of this specification, in which—

Figure 1 is a plan or top view of a machine with my improvements. Fig. 2 is a front elevation of the same. Fig. 3 is a transverse section of the finger-bar and cutter. Fig. 4 is a detached view of a portion of the rake-gearing, hereinafter described.

Similar letters of reference indicate corresponding parts in the several views.

My said improvements consist, first, in a rake of novel construction for removing the grain from the platform when cut; second, in devices for regulating the motion of said rake; third, in devices to prevent the displacement or scattering of the grain upon the platform, or when deposited on the ground.

To enable others skilled in the art to make and use my invention, I will proceed to describe its construction and operation.

A is the main frame of the machine, resting at back upon a driving-wheel, B, and carrying wheel B', and at front upon an adjustable caster-wheel, C.

D is the draft-pole.

E is the reel.

F represents the cutting apparatus, which may be constructed and operated in any suitable manner.

G is a platform formed of slats curved vertically.

H is a rake mounted upon the end of an arm, I, which is pivoted to the upper part of a high frame, J.

K is a circular guide, affording lateral support to the arm I.

The rake is pivoted in the end of the arm, so as to admit of the teeth being turned into an effective position to remove the grain from the platform, and falling back in leaving the grain.

$h$ is spring employed to retract the rake and hold it against a stop-pin, $h'$, in a position at right angles to the shaft, as shown in Fig. 1 and in red in Fig. 2.

$h^2$ is an arm or lever, which, passing beneath a segmental flange, L, holds the rake in its working position while passing over the platform, as shown by black lines in Fig. 2.

I is a yielding hood, pivoted upon and covering the rake, and pressed outward by a spring, $i'$. The office of the said hood is, first, to press upon the grain which is being raked from the platform and hold it in a compact body in front of the rake; and, second, to shed such cut grain as would otherwise fall upon and entangle the rake.

The shaft $b$ of the driving-wheel carries two bevel-gears, M M, of unequal diameter. N is an inclined shaft journaled in the frame J.

$n$ is a bevel-gear fitted loosely upon the shaft N, but caused to turn therewith when the machine is moving forward by means of a slotted clutch-sleeve, $n'$, sliding upon a pin or feather on the shaft, and formed with ratchet-teeth, which take into corresponding teeth on the hub of the wheel $n$.

O is a nut, by means of which the sleeve $n'$ may be set up or down upon the shaft N, causing the wheel $n$ to mesh with either wheel M or M' to regulate the motion of the rake, or throwing it out of gear altogether. These parts are more clearly shown in Fig. 4, where the upper position of the wheel $n$ is shown in black and the lower position in red. The motion of the inclined shaft N is communicated through the gearing $p\,p'$ to the horizontal shaft P of the rake-arm I.

Q is an inclined plate formed with a flange and serving to catch the grain as it is raked from the platform to prevent its being scattered and deposit it compactly on the ground.

$q'$ is a bar by which the plate Q is attached to the platform.

W is a fender, which deflects the standing grain out of reach of the rake. The direction in which the rake revolves is shown by the arrow.

$r$ is a guide covering the back of the cutter-bar and projecting so far above the finger-bar and platform as to confine the cut grain and prevent the straw and blades from choking the cutters.

The height of the finger-bar and platform is regulated by means of a hand-lever, S, fulcrumed in the upper part of the standard $c$ of the caster-wheel C, and carrying a score-pulley, T, to the periphery of which is attached a chain, t, connected at its lower end to the front of the main frame. The front of the machine is thus suspended from the pulley T, and by depressing the hand-lever S the cutting apparatus may be raised to any height. s is a key, which, in passing through holes in the brackets s', retains the lever S in any position desired. To lessen the friction in thus raising and lowering the front of the machine, the standard C works between the rollers c' c'. The reel is adjusted in height by means of set-nuts U upon hangers u, attached to the bearings in which the reel turns.

V is the driver's seat.

X is a vertical guide-board, projecting upward from the inclined right-hand portion of the platform to prevent the cut grain passing off the platform in front or becoming entangled in the wheels. The said guide is placed so far in advance of the cutters as not to endanger stopping the grain as it is swept sidewise off the platform.

Y is a similar guide-board, to prevent the grain passing off the platform at back.

Having thus described my invention, what I claim therein as new, and desire to secure by Letters Patent, is—

1. In the described combination with the vertically-curved platform G, the rake H, pivoted to and projecting horizontally forward from the rake-arm I, by which it is carried in a vertical orbit, all as herein shown and described.

2. The guide L and spring h, operating in the described combination, with the pivoted rake-head H, to present it in the proper position to gather the grain and afterward retract it therefrom.

3. The fender Q, employed in combination with the pivoted rake H, in the manner and for the purpose specified.

4. The yielding hood i, operating in combination with the revolving rake H I, substantially as and for the purposes explained.

5. A platform constructed of vertically-curved slats placed transversely of the machine at sufficient distance apart to admit the points of the rake-teeth between them, when used in combination with the rake H I, revolving in a vertical orbit, all as herein shown and described.

JOHN RYNEARSON.

Witnesses:
OCTAVIOUS KNIGHT,
E. EVANS, Jr.